(12) United States Patent
Peterson et al.

(10) Patent No.: US 6,779,274 B2
(45) Date of Patent: *Aug. 24, 2004

(54) DISPENSER FOR MAINTAINING LENGTH OF FLEXIBLE LINE EXTENDING FROM A SPOOL

(75) Inventors: Dennis R. Peterson, Austin, TX (US); Joseph A. Peterson, Austin, TX (US); Mary L. Peterson, Austin, TX (US)

(73) Assignee: Peterson Science & Technology, Inc., Austin, TX (US)

( * ) Notice: Subject to any disclaimer, the term of this patent is extended or adjusted under 35 U.S.C. 154(b) by 663 days.

This patent is subject to a terminal disclaimer.

(21) Appl. No.: 09/929,415

(22) Filed: Aug. 14, 2001

(65) Prior Publication Data

US 2002/0007560 A1 Jan. 24, 2002

Related U.S. Application Data

(63) Continuation of application No. 09/565,849, filed on May 5, 2000, now Pat. No. 6,487,780, and a continuation of application No. 09/120,811, filed on Jul. 22, 1998, now Pat. No. 6,311,398.
(60) Provisional application No. 60/133,090, filed on May 7, 1999, provisional application No. 60/112,216, filed on Dec. 14, 1998, and provisional application No. 60/053,419, filed on Jul. 22, 1997.

(51) Int. Cl.[7] ............................................ A01D 34/416
(52) U.S. Cl. ......................................... 30/347; 30/276
(58) Field of Search ..................... 30/276, 347; 56/12.7

(56) References Cited

U.S. PATENT DOCUMENTS 5,675,897 A * 10/1997 Berfield ........................ 30/276
5,743,019 A * 4/1998 Berfield ........................ 30/276
6,035,511 A * 3/2000 Wood ........................ 30/276 X

FOREIGN PATENT DOCUMENTS

WO          96/39800          12/1996

* cited by examiner

Primary Examiner—Douglas D. Watts
(74) Attorney, Agent, or Firm—Jack V. Musgrove (57) ABSTRACT

The spool impeller is a fully automatic cutting head for whirling filament vegetation trimmers, simpler, less expensive, and more reliable than the predecessors. Unlike the predecessors, the spool impeller does not waste filament. It consists of a single part, a small diameter spool attached to the drive shaft. The free end of filament coiled on the spool extends tangentially so that the tip traces a circle about the axis of rotation. In use, the coiled filament gradually unwinds to compensate for filament wear, maintaining a cutting swath of precisely constant size. There is no need for the operator to monitor the filament. Feeding new filament is controlled by the aerodynamic drag and centrifugal force acting directly on the extended filament. If the length of the extended filament is correct, drag and centrifugal force balance, and no unwinding or rewinding occurs. Too long, drag dominates over centrifugal force, rewinding the extended filament onto the spool just enough to restore the proper length. If the extended filament is shortened by wear, centrifugal force dominates over drag, unwinding the extended filament just enough to restore the proper length. A mechanism to index the spool or to release a spool brake to feed more filament is unnecessary: the spool impeller is fixed onto the drive shaft and does not rotate with respect to the drive shaft. Reloading is fast and easy. No disassembly is required.

Other systems, devices and methods are disclosed.

14 Claims, 8 Drawing Sheets

Table 1

$$R = \frac{r}{r_t} \qquad \nu = \sqrt{1 + P^2} \qquad R_e = \frac{r_e}{r_t} \qquad v_1 = 1 + \nu$$

$$Q = R \sin \alpha \qquad P = \frac{C_D \rho_g d_f r_t}{\rho_f a_f} \qquad Q_t = \frac{\nu - 1}{P} \qquad v_2 = 2 + \nu$$

$$W = R^2 \qquad\qquad\qquad\qquad Z_e = P\sqrt{1 - R_e^2} \qquad v_3 = \sqrt{\frac{1}{6} \frac{\nu - 1}{\nu + 2}}$$

$$Z = P\sqrt{1 - W} \qquad\qquad \alpha_t = \mathrm{asin}\left(\frac{\nu - 1}{P}\right) \qquad v_4 = \sqrt{\frac{2}{3} \frac{\nu + 2}{\nu + 1}}$$

| | | | |
|---|---|---|---|
| s | arc length, increasing from the point of tangency to the tip | t | filament tension |
| $r_t$ | radius to the free tip of the filament | $r_e$ | radius to the point of tangency of the filament to the spool |
| $r_a$ | actual radius of the spool, corrected for filament thickness | P | the whirling filament parameter, a dimensionless parameter indicating the ratio of drag to centrifugal force |
| $C_D$ | coefficient of drag | $\rho_g$ | fluid density |
| $\rho_f$ | filament density | $d_f$ | filament diameter |
| $a_f$ | filament cross sectional area | $\omega$ | angular velocity |
| n | number of layers of coiled filament | $P_a$ | aerodynamic power dissipated |
| C | arbitrary constant | $J_\nu$ | Bessel function of the first kind, of order $\nu$ |
| $Y_\nu$ | Bessel function of the second kind, of order $\nu$ | $F_\nu$ | Modified quotient function of the first kind, of order $\nu$ |

The subscript e refers to the point of tangency between the filament and the spool.

The subscript t refers to the tip of the extended filament.

DISPENSER FOR MAINTAINING LENGTH OF FLEXIBLE LINE EXTENDING FROM A SPOOL

CROSS REFERENCE TO RELATED APPLICATIONS

The present application claims priority from U.S. Provisional Applications Nos. 60/112,216 (filed on Dec. 14, 1998) and No. 60/133,090 (filed on May 7, 1999), and co-pending U.S. patent application Ser. No. 09/120,811 (filed on Jul. 22, 1998) now U.S. Pat. No. 6,311,398 further claims priority from provisional patent application serial No. 60/053,419 filed Jul. 22, 1997 which further claims priority from provisional patent application serial No. 60/053,419 filed Jul. 22, 1997; each of which are hereby incorporated by reference in their entirety.

This application relates to, and is a continuation of, co-pending U.S. patent application Ser. No. 09/120,811 filed on Jul. 22, 1998, now 6,311,398, entitled "Method and Apparatus for Simplified, Fully Automatic Spool Filament Impeller for Use in Vegetation Trimmer Cutting Heads and Other Applications" naming Dennis R. Peterson and Joseph A. Peterson as inventors, the application being hereby incorporated herein by reference in its entirety.

This application relates to and is a continuation and claims priority from co-pending U.S. patent application Ser. No. 09/565,849 filed on May 5, 2000, now 6,487,780 entitled "Rotary Device for Automatically Deploying and Retracting A Cord-Like Element from a Storage Device" naming Dennis R. Peterson and Joseph A. Peterson as inventors, the application being hereby incorporated herein by reference in its entirety.

TECHNICAL FIELD OF THE INVENTION

The present invention relates generally to a method and apparatus for unwinding a filament from a spool, and more particularly to an improved method and apparatus for a fully automatic spool filament impeller for use in vegetation trimmers and other applications benefiting from continuously adjusting filament extension to maintain a constant length.

BACKGROUND

There are three types of cutting heads for vegetation trimmers that use filaments for cutting the vegetation: manual, semiautomatic, and automatic. With manual and semiautomatic vegetation trimmers, the operator must monitor filament wear. When the filament becomes too short to be effective, the filament must be extended or replaced by the operator. Today most filament vegetation trimmers come equipped with manual or semiautomatic cutting heads.

An operator using a manual vegetation trimmer is responsible for monitoring the filament length and adjusting its length as needed to maintain effective cutting. The operator must stop the trimmer to a) manually extend the filament; or b) discard the stub length of old filament, install a new length of filament and manually extend the filament to the correct starting length. Using manual vegetation trimmers also means taking valuable time to adjust the filament to the correct cutting length.

If the operator is using a semiautomatic vegetation trimmer, the operator is also responsible for monitoring the filament length and adjusting the filament length to maintain the appropriate cutting length. When the operator detects that the filament needs adjustment, the operator must take the time to directly activate a mechanism to extend the filament. For these semiautomatic systems it is not always necessary to stop the trimmer before making a filament length adjustment. If the filament needs replacement then the trimmer must be stopped before replacing the filament on the spool. Using semiautomatic vegetation trimmers also means interrupting the trimming operation and taking valuable time to adjust the filament to the correct cutting length. Some filament is wasted when only a portion of the length needs replacement and an excess of what is needed is automatically released. In addition, because semi-automation means a greater number of active parts, the initial purchase price for the device is higher as is the likelihood of having to repair or replace parts for proper operation.

With an automatic vegetation trimmer, the operator does not need to monitor the filament length. Without operator intervention, an automatic vegetation trimmer cutting head periodically extends a new fixed length of filament. Filament is deployed from an internal spool through a hole in a housing upon an automatic mechanism's periodic (a) release of a spool brake or (b) indexing of the spool by advancing it to its next predefined position.

In some automated trimmers, a counterweight counterbalances the filament tension and the automatic mechanism is activated by the mechanism's detection of reduced filament tension. During operation, other automatic vegetation trimmers activate the automatic mechanism upon detecting the filament spool's increased rotational speed beyond some preset range.

Cutting swath size fluctuations are inherent in automatic and semiautomatic vegetation trimmers whose automatic feeding mechanisms deliver a fixed length of filament with each activation. Some filament is wasted when only a portion of the length needs replacement and the automated mechanism releases an excess of what is actually needed. If the extended filament is too long, the trimmer is overloaded and its motor may fail prematurely. Electric trimmers are especially sensitive to overloading. Motor overloading due to the stress of overlong extended filaments is a problem common to manual, semiautomatic, and automatic vegetation trimmers.

Ideally, to conserve filament, only the tip of the extended filament should strike the vegetation. While the automatic or semiautomatic vegetation trimmer is engaged in trimming vegetation, each time the size of the cutting swath suddenly increases by some fixed automatically dispensed length of filament, a segment at the distal end of the extended filament impacts the vegetation. While operating with an increased cutting swath, more than the tip of the extended filament strikes the vegetation. The extended filament segment making contact with the vegetation receives impact damage throughout its length. This impact damage results in premature filament failure and the periodic loss of whole segments of filament.

An overly long filament segment is likely to fail at a point recessed back from the tip. The result is the periodic loss of whole segments of filament rather than the gradual wear of material from the tip. To prevent excessive length, some prior trimmers are equipped with a cutoff blade positioned to cut off excess filament. Not only does this waste filament, but the severed flying tip is annoying or even dangerous.

Significant wear accumulates before the activation threshold of the automatic filament feeding mechanism is exceeded. Automatic and semiautomatic vegetation trimmers operate in a cycle of gradual declines and sudden increases in the cutting swath. This cycle results in wasted filament and difficulty in maintaining refined control of the cutting swath which may result in wasteful repetitive operator motion or inadvertent cuttings.

Automation and semi-automation mechanisms typically found in vegetation trimmers mean a greater number of active parts and corresponding greater complexity and weight. Easily maneuvered weight is important to users that frequently operate the device for long periods as well as infrequent users who may lack physical conditioning to wield the heavier trimmers for even short periods such as would be required in dressing a relatively small vegetation area. The initial purchase price for automatic and semiautomatic devices with their greater number of parts and complexity is higher as is the likelihood of having to repair or replace parts for proper operation. Most automatic and semi-automatic cutting heads must be disassembled for reloading. The casual occasional users and inexperienced users must consult a manual or waste time on trial and error efforts. Reloading seems to be particularly complex.

An ideal vegetation trimmer would (a) minimize wasting the operator's time in non-trimming operation, (b) conserve filament, (c) maintain a consistent and predictable cutting perimeter, (d) have a simplified design to reduce initial purchase cost and maintenance cost, (e) be lightweight, and (f) be simple to operate and reload. The above inventions fail to meet these individual and combined goals for an ideal vegetation trimmer. For the foregoing reasons, there is a need for a fully automatic vegetation trimmer which does not waste filament and which is simple, easy to use, consistent, reliable, and inexpensive.

SUMMARY

The present invention is directed to an improved method and apparatus for a fully automatic spool filament impeller for use in vegetation trimmers and other applications benefiting from continuously adjusting a rotating filament centrifugally extended such that a constant extended filament length is maintained. The present invention satisfies the needs identified above for a device that (a) minimizes wasting the operator's time in non-trimming operation, (b) conserves filament, (c) maintains a consistent and predictable cutting perimeter, (d) has a simplified design to reduce initial purchase cost and maintenance cost, (e) is lightweight, and (f) is simple to operate and reload.

The present invention comprises a fully automatic spool filament impeller which when applied to vegetation trimmers does not waste filament and is simple, easy to use, consistent, reliable, and inexpensive. An automatic spool filament impeller having features of the present invention comprises a spool of diameter appropriate to extend a desired length of a filament made of a material appropriate for the application, such that, as the filament extends tangentially from the rotating spool, the free distal end of the filament traces a circle of a desired radius about the spool's axis of rotation; the filament having one end affixed to the spool; the spool affixed to a means for rotating the spool.

The method of manufacturing an automatic spool filament impeller having features of this invention comprises the steps of determining the radius or diameter of a desired circular area or cutting swath to be defined by a distal tip of an extended length of filament rotating about an axis; selecting a filament of a material appropriate for the application; using the desired cutting swath diameter and characteristics of the selected filament to determine the ideal radius range of the spool; manufacturing a spool having the desired characteristic radius; winding a length of the selected filament about the manufactured spool of predetermined diameter; and affixing the spool to a means for rotating the spool at a speed sufficient to achieve and maintain the desired tangential extension of the filament about the spool when it is rotating.

The term filament, as used throughout this specification, is understood to comprise: a monofilament length of material; a multi-filament length of material; a poly-filament length of material; concatenated segments forming a length of material; and any other variation of a length of material having an application appropriate cross-section and is made of material capable of performing the desired function in conjunction with the automatic spool filament impeller. The word filament also incudes a combination of any of the above.

The term material comprises natural or man-made; metallic or not metallic materials. Example types of filament comprise: beaded or linked chain; wire; fiber optic thread or cable; monofilament or multi-filament thread; yam; string; tape; ribbon; tow; rope; cord; music wire; and cable any of which may be made using one or a combination of: pure metals, metal alloys, steel, brass, boron, quartz, carbon, glass, ceramic, cotton, wool, silk, flax, hemp, elastomers, polymers, plastics, nylon, rayon, Kevlar™, spider silk, or Teflon™

Some versions of the present invention use more than one filament and/or more than one filament type depending on the application. Selection of filament type and number is made taking into account the device in conjunction with which the automatic spool filament impeller will be used and the particular application of that device. Various example applications of the automatic spool filament impeller are presented in this specification.

One advantage of applying this invention is that a reeling mechanism for retracting or extending a length of filament is unnecessary. The rotating spool impeller makes constant adjustments to maintain a cutting swath of a prescribed, unvarying size. If a portion of the extended filament breaks off, the remaining portion of extended filament increases its rotation speed relative to the rotating speed of the spool such that it unwinds the precise amount of filament necessary to restore the extended filament (and thereby the cutting swath) to the correct size. If the extended filament portion is too long, the extended filament's rotating speed decreases relative to the rotating speed of the spool thereby rewinding just enough filament to restore the extended filament (and thereby the cutting swath) to the correct size. When the extended filament is of the correct length, the automatic spool filament impeller system is in equilibrium and the portion of filament which is extended is neither increased nor decreased because the rotational speed of the filament distal end is substantially equal to the rotational speed of the spool.

Applying the present invention to a vegetation trimmer, one can see that the size of the cutting swath is governed by centrifugal force and drag acting directly on the extended filament. If the extended filament is too long, drag overcomes centrifugal force and the extended filament rewinds. If the extended filament is too short, centrifugal force overcomes drag and the extended filament unwinds. If the extended filament is correct, drag and centrifugal force balance. Any deviation, large or small, is quickly compensated by the rewinding or unwinding of the precise amount of filament to restore the vegetation trimmer's desired cutting swath.

The needs for a separate automatic or semiautomatic spool/filament advancing mechanism and a filament length monitoring mechanism are eliminated. The spool impeller cannot deploy an extended filament of excessive length, so the commonly used cutoff blade (to prevent overloading the trimmer motor) is eliminated. The automatic spool filament impeller is easy to reload, no disassembly or tools are required. In addition to the advantage of dispensing with the above described mechanisms, the present invention also offers the following advantages: there is no special spool housing required, and the spool impeller is directly affixed to the drive shaft. As a result of reducing the required number of parts: weight and cost are reduced while ease of use, maneuverability, and reliability are improved.

The automatic spool impeller of the present invention, when used as part of a fully automatic vegetation trimmer cutting head, improves the performance of the automated vegetation trimmer and is simpler, lighter, and less expensive to manufacture, operate and maintain. There is no need for the operator to monitor the filament as with prior manual and semiautomatic cutting heads. Periodic sudden increases in the size of the cutting swath and the resulting wasteful consumption of filament characteristic of prior automatic vegetation trimmer cutting heads are eliminated.

The vegetation trimming application is just one of many possible applications. The automatic spool filament impeller invention is useful for any process involving a whirling filament that is consumed. Examples include the mixing of fluids, paint and rust removal, cleaning smokestacks, debarking logs, staple fiber production and other applications described in this specification. There are many other applications.

It is therefore the object of the present invention to provide an automatic spool impeller for use in applications benefiting from continuously adjusting a rotating filament, centrifugally extended such that a constant extended filament length is maintained.

It is another object of the present invention to provide a fully automatic spool filament impeller for use in vegetation trimmers.

It is a further object of the present invention to provide an automatic spool filament impeller that reduces wasted operator time in non-trimming operations.

It is a further object of the present invention to provide an automatic spool filament impeller that minimizes wasting the operator's time by reducing preparation for operation.

It is a further object of the present invention to provide an automatic spool filament impeller that minimizes wasting the operator's time in repair operations.

It is a further object of the present invention to provide an automatic spool filament impeller that conserves filament.

It is a further object of the present invention to provide an automatic spool filament impeller that automatically maintains a consistent and predictable perimeter inscribed by the distal end of the filament extended during operation of the spool rotating at some predetermined speed.

It is a further object of the present invention to provide an automatic spool filament impeller that maintains a consistent and predictable cutting swath.

It is a further object of the present invention to provide an automatic spool filament impeller that has a simplified design to reduce manufacturing cost.

It is a further object of the present invention to provide an automatic spool filament impeller that has a simplified design to improve reliability and reduce maintenance cost.

It is a further object of the present invention to provide an automatic spool filament impeller that is lightweight.

It is a further object of the present invention to provide an automatic spool filament impeller that is simple to operate.

It is a further object of the present invention to provide an automatic spool filament impeller that is simple to reload.

It is a further object of the present invention to provide an automatic spool filament impeller that unravels as necessary but does not unravel easily otherwise.

It is a further object of the present invention to provide an automatic spool filament impeller that is useful for any process involving a whirling filament that is consumed.

It is a further object of the present invention to provide an automatic spool filament impeller that is useful for mixing fluids.

It is a further object of the present invention to provide an automatic spool filament impeller that is useful for paint and rust removal.

It is a further object of the present invention to provide an automatic spool filament impeller that is useful for cleaning smokestacks.

It is a further object of the present invention to provide an automatic spool filament impeller that is useful for debarking logs.

It is a further object of the present invention to provide an automatic spool filament impeller that is useful for staple fiber production.

Other and further objects of the present invention will become apparent from a reading of the following description taken in conjunction with the appended claims.

In order to meet the foregoing objectives and to overcome the problems inherent in the prior art devices, the present invention provides a method and apparatus for an automatic spool filament impeller for use in applications benefiting from continuously adjusting a rotating filament attached at one end to a rotating spool, the filament centrifugally extended such that a constant extended filament length is maintained.

In one form of the invention, an automatic spool filament impeller having features of the present invention comprises a spool of a diameter appropriate to extend a desired length of a filament made of a material appropriate for the application, such that, as the filament extends tangentially from the rotating spool, the free distal end of the filament traces a circle of a desired radius about the spool's axis of rotation; the filament having one end affixed to the spool; the spool affixed to a means for rotating the spool.

In another form of the invention, the above described automatic spool filament impeller is operationally combined with a vegetation trimmer.

In another form of the invention, a method for manufacturing an automatic spool filament impeller having features of this invention, comprises the steps of: determining the radius or diameter of a desired circular area or cutting swath to be defined by a distal tip of an extended length of filament rotating about an axis; selecting a filament of a material appropriate for the application; using the desired cutting swath diameter and characteristics of the selected filament to determine the ideal radius range of the spool; manufacturing a spool having the desired characteristic radius; winding a length of the selected filament about the manufactured spool of a predetermined diameter; and affixing the spool to a means for rotating the spool at a speed sufficient to achieve and maintain the desired tangential extension of the filament at a point on the spool's cylindrical surface when the spool is rotating.

BRIEF DESCRIPTION OF THE DRAWINGS

The novel features believed to be characteristic of the invention are set forth in appended claims. For a more complete understanding of the present invention, and for further details and advantages of it, reference is now made to the following Detailed Description taken in conjunction with the accompanying drawings which show the following:

It is to be expressly understood, however, that the drawings are for purposes of illustration only and are not intended as a definition of the limits of the invention. Such definition is made only by the appended claims.

DETAILED DESCRIPTION OF THE DRAWINGS

Figures 1, 2, 4:
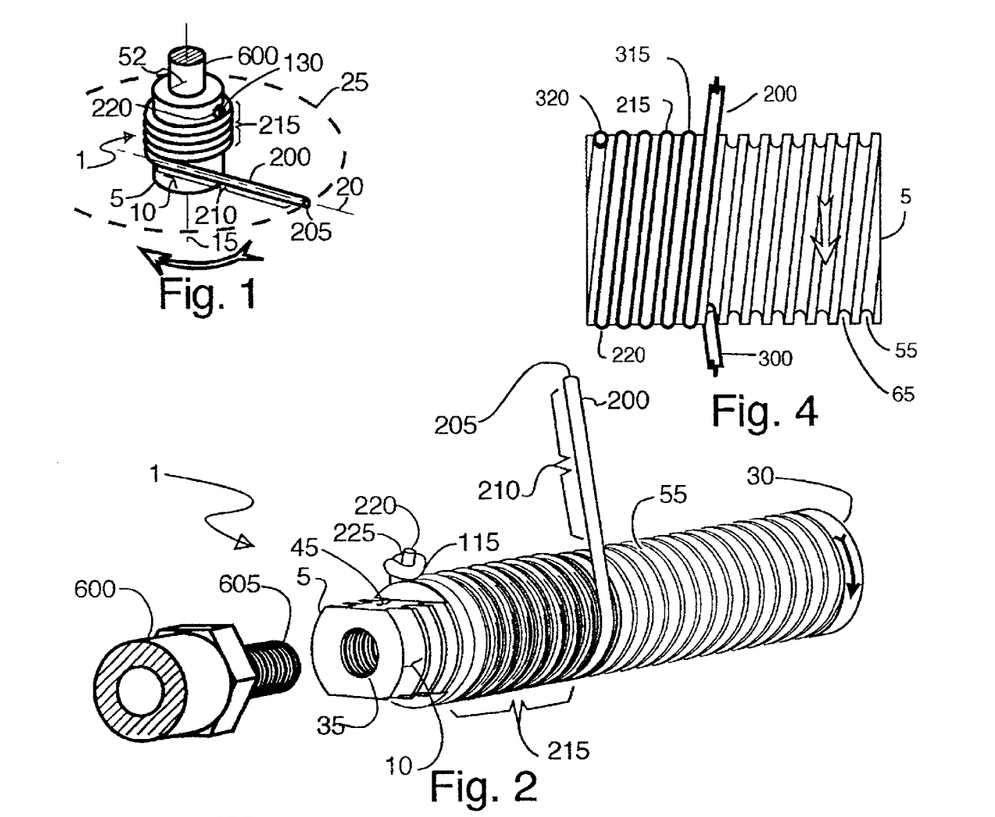
FIG. 1. Oblique view of a spool impeller with filament installed and in operation.
FIG. 2. Oblique view of a spool impeller with a helical filament gripping groove for holding the filament (with installed filament).
FIG. 4. Side view of a spool impeller with a double helical filament gripping groove with two partially spooled filaments.

FIG. 1 presents an oblique view of one preferred embodiment of the automatic spool filament impeller (1) with filament (200) installed and in operation. FIG. 2 presents an oblique view of an automatic spool filament impeller (1) with a helical filament gripping groove (55) for holding the filament with the filament installed. Please refer to FIGS. 1 and 2 for the following discussion.

The automatic spool filament impeller (1) comprises a spool (5) with a helical gripping groove (55) (see FIG. 2) inscribed on the outer cylindrical surface (10) of the spool (5). The spool (5) and gripping groove (55) share and rotate about the same axis (15). The outer radius (52) of the spool (5) is of the appropriate size to deploy an extended filament (210) suitable for the application such that during spool (5) rotation, the extended filament (210) unwinds to extend tangentially from a point on the outer cylindrical surface (10) or helical filament gripping groove (55) of the spool (5) to produce a cutting swath (25) of a diameter range appropriate for the application. The free distal end (205) of the extended filament (210) traces a circle (25) about the axis (15) if the automatic spool filament impeller (1) is operated in a specified environment at a specified rotational velocity and in the appropriate direction. The spool (5) has an axial female thread (35) (see FIG. 2) inscribed on the outer cylindrical surface (10), a set of wrench flats (45) (see FIG. 2), and a protective end cap (30)(see FIG. 2). In a preferred embodiment, at least one filament (200) is helically wound about the spool (5). Filament(s) (200) may be wound in one or more layers. Discussion of other Figures below present other examples of winding one or more filament(s) (200) about the spool (5).

The spool (5) is of the appropriate size to deploy the extended filament (210) to create a cutting swath (25) of a prescribed size. Because the extended filament (210) is deployed tangentially, free to unwind and rewind, drag and centrifugal force act directly on the extended filament(s) (210); rewinding if it is too long, unwinding if it is too short. If the extended filament (210) is the correct length, such that during operation of the automatic spool filament impeller (1) the resulting cutting swath (25) is the correct size, then drag and centrifugal forces balance. Thus, a cutting swath (25) of unvarying size is maintained.

As the extended filament (210) gradually wears away during use, each small bit of wear is quickly replaced through automatic advancement of the extended filament (210). One advantage of the present invention is that it eliminates the need for a mechanical, or electromechanical advancement mechanism. As a result of this continuous replacement of worn-off filament, a large deviation of the cutting swath (25) from the prescribed size is not allowed to accumulate and the cutting swath (25) dimension is substantially constant. Similarly, if a large piece or segment of the extended filament (210) should break off, the shortened filament quickly unwinds through the precise angle to accurately restore the size of the cutting swath (25). The virtual elimination of variations in cutting swath (25) results in a more consistently predictable and controllable cutting swath (25) (affected area).

Because the spool (5) essentially cannot, even inadvertently, sustain a cutting swath (25) of excessive size, and thus overload the rotatable shaft (600), the prior art's need for the commonly supplied cutoff blade in vegetation trimmers with which to limit the length of an extended filament is eliminated.

Referring to FIG. 2, a knot (225) couples the filament (200) to the spool (5) thereby preventing the filament proximal end (220) of the filament (200) from pulling through an anchoring hole(s) (115) (see FIG. 3) on the spool (5). Other means of anchoring the proximal end (220) of the filament (200) to the spool (5) may be used to help maintain winding tension, prevent extension of the proximal end (220) of the filament (200) and prevent inadvertent unwinding. Other means of anchoring the filament (200) to the spool (5) are presented in the discussion of other Figures. It is not necessary to anchor the proximal end (220) nor the distal end (205) of the filament (200) to the spool (5).

The helical filament gripping groove (55) grips the filament coils (215) sufficiently tight to hold them in place when the rotatable shaft (600) is turned off (that is to say not rotating), but not so tightly as to interfere with winding and unwinding of the extended filament (210) when the automatic spool filament impeller (1) coupled with a means for rotating such as rotatable shaft (600) is in operation.

The helical filament gripping groove (55) also acts as a guide for the operator to easily wind the filaments (200) in the proper way. This feature of a preferred embodiment of the invention, facilitates use of the automatic spool filament impeller (1) by an operator who makes minimal reference to an instruction manual or who has limited experience, patience, or mechanical aptitude.

The end cap (30) protects the spool (5) from damage. For example in the case of use in a vegetation trimmer, the end cap (30) protects the automatic spool filament impeller (1) from damage by rocks and dirt with which it might come in contact.

The wrench flats (20) provide for convenient spool (5) installation to and removal from a means for rotating the spool (5) of the automatic spool filament impeller such as a rotatable shaft (600). The axial female thread (25) allows the spool (5) to be mounted on a rotatable shaft (600) equipped with a male mounting thread (605) or an adapter (40)(see FIG. 3).

The rotatable shaft (600) may be an active element in any device appropriate for the applications described in this specification. These applications include but are not limited to vegetation trimmers; atomizers; vaporizers; liquid or liquid and gas mixers; paint or rust or scale removers; tree debarkers; dynamometers; viscometers; annunciators such as sirens and light sources; cutting, sawing and machining devices; devices for surface cleaning, pinging or abrading; devices for facilitating chemical or physical reactions in shock waves; and devices for the manufacture of staple fibers.

In FIG. 1, a spool (5) of appropriate size is mounted on a rotatable shaft (600) which spins about an axis (15). A coil of filament (215) is wound on the spool (5) in a left-handed helix pattern. The extended filament (210) which extends along a tangent (20) from a point resting on the outer cylindrical surface (10) such that the distal end (205) of the extended filament (210) traces a circle of prescribed size about the axis (15), thus forming the cutting swath (25). The proximal end (220) of the filament (200) is anchored to the outer cylindrical surface (10) of spool (5) with a staple (130).

In FIG. 2, a helical filament gripping groove (55) of cross sectional geometry appropriate to the filament (200) is cut into the outer cylindrical surface (10) of the spool (5). A knot (225) is tied in the proximal end (220) of the filament (200) and the filament (200) is threaded through the filament anchoring hole (115) (also refer to FIG. 3) substantially perpendicular to the axis (15). The filament (200) is wound into the helical filament gripping groove (55) forming a coil (215).

The axial female thread (35) is suitable for mounting the automatic spool filament impeller (1) on a rotatable shaft (600) equipped with a male mounting thread (605). The end cap (30) protects the spool (5) from damage in operation. One preferred embodiment features wrench flats (45) which facilitate installation of the spool (5) onto a rotatable shaft (600) equipped with a male mounting thread (605).

Figure 3:
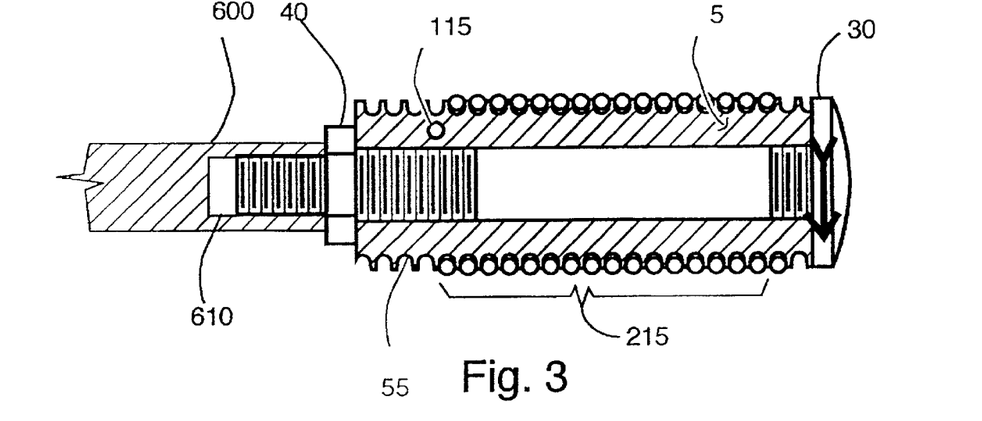
FIG. 3. Side view of a spool impeller with a helical filament gripping groove, sectioned by a horizontal plane.

In FIG. 3, the spool (5) is axially sectioned to better illustrate an exemplary geometry of the helical groove (55) and configuration of filament coil (215). Note exemplary cross-sectional view of the filament (200) anchoring means (115). This version of an anchoring means is formed by creating a cylindrical tunnel of appropriate shape though which a filament (200) proximal end (220) may be threaded. The proximal end (220) having been threaded through the anchoring hole (115) may then be tied into an anchoring knot (225) as shown in FIG. 2 or not tied at all.

In a preferred embodiment shown in FIG. 3, the rotatable shaft (600) is equipped with a female mounting thread (610) to demonstrate the combination with a female-to-male adapter (40) such that the female mounting thread (610) can be indirectly coupled to the non-matching spool (5) female thread (35). The analogous configuration of a rotatable shaft (600) equipped with a male mounting thread (610')coupled to a spool (5) having a male thread (35') can also be resolved using a male-to-female adapter (40').

FIG. 4 illustrates the use of two helical filament gripping grooves (55, 65) to mount two filaments (200, here labeled 200, 300 for clarity) to form two filament coils (215, 315). The proximal ends (220 and 320) of the filaments (200, 300) are anchored to the spool (5).

Figure 5:
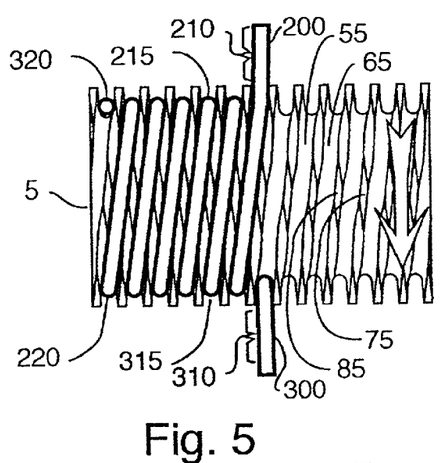
FIG. 5. Side view of a spool impeller with a left-handed and a right-handed set of double helical filament gripping grooves showing a partially wound first layer of two filaments.
Figure 6:
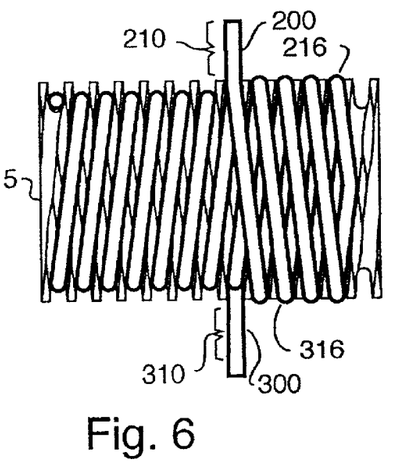
FIG. 6. Side view of the spool impeller of FIG. 5 showing a completely wound first layer and a partially wound second layer.
Figure 7:
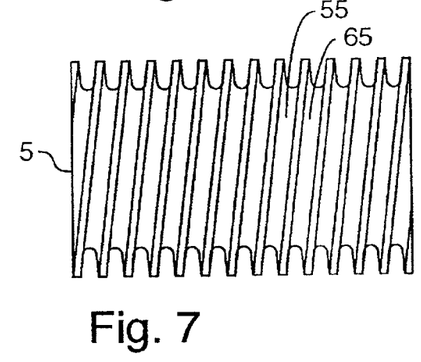
FIG. 7. Side view of the spool impeller of FIG. 5 without filaments, showing the left-handed double helical filament gripping groove by itself without the right-handed double helix.
Figure 8:
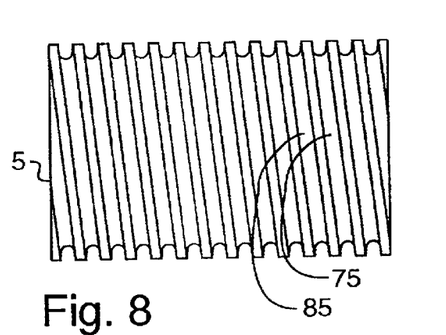
FIG. 8. Side view of the spool impeller of FIG. 5 without filaments, showing the right-handed double helical filament gripping groove by itself without the left-handed double helix.

FIGS. 5, 6, 7, and 8 illustrate preferred embodiments using two sets of double helical filament gripping grooves: one set of left-handed double helical filament gripping grooves (55, 65) and one set of right-handed double helical filament gripping grooves (75, 85). The use of double helical filament gripping grooves (55, 65 or 85, 75) allows two filaments (200, 300) to be installed. The use of two sets of helices allow one or more layer(s) of filament (200, 300) to be wound. FIG. 5 shows a partially wound helical layer of filaments (200, 300) to form coils (215, 315). To assist in visualization, FIG. 7 shows the left-handed double helix (55, 65) by itself, and FIG. 8 shows the right-handed double helix (75, 85) by itself.

In FIG. 6, the winding of the first layer of coils (215, 315) is complete. A partially wound second layer of filaments (200, 300) producing coils previously labeled (215, 315) are uniquely labeled (216, 316) to illustrate coils configured in a multi-layer double helical embodiment.

To increase the amount of filament (210) available without resorting to additional operator action, more than one layer of filament coil (215) may be wound onto the spool (5). In the case of the two filament example, the filament (200, 300) must be wound tightly and uniformly to avoid entangling the filaments (200, 300) or layers of coil (216, 316).

Each time one of the layers of filament coil is used up, the effective size of the spool radius decreases and there is a corresponding reduction in the size swath (25). This fact must be kept in mind when deciding how many layers of coil windings are suitable for a particular application and particular type of filament (200) to be used. The change in effective radius of the spool (5), as the coil (215) layers unwind, must be consistent with the desired swath (25) size range that is required by the particular application.

FIGS. 5 and 6 also illustrate a possible instant in time during the operation of the automatic spool filament impeller (1) in a simplified two filament version of a general case for operation with more than one filament. In combination with FIG. 2, FIGS. 5 and 6 both show extended filaments (210, 310) tangentially extended from different points resting on the surface of the double helical filament gripping grooves (55, 65 or 85, 75) inscribed on the outer surface (10) of the spool (5).

Figure 20:
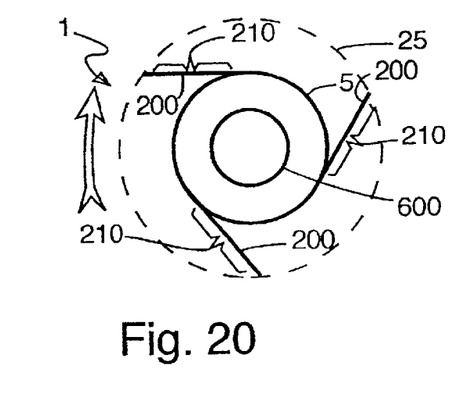
FIG. 20. Top view of a an automatic spool filament impeller deploying three filaments.
Figure 21:
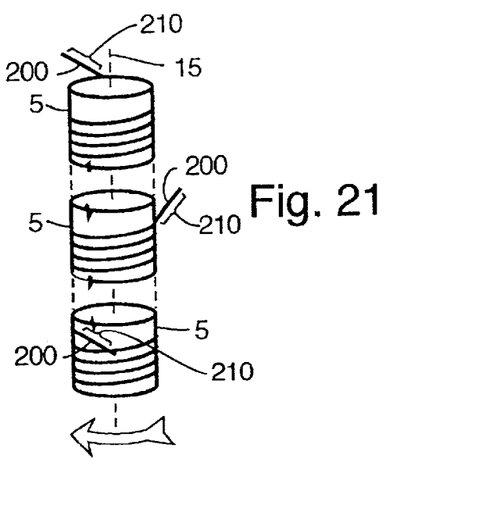
FIG. 21. Oblique view of an automatic spool filament impeller deploying a plurality of filaments.

FIGS. 20 and 21 also show other simplified examples of a plurality of extended filaments (210) tangentially extended from different points resting on the outer surface (10) of the spool (5) during operation of the automatic spool filament impeller (1).

Figure 9:
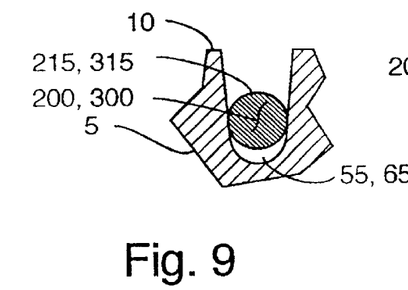
FIG. 9. Detail showing the cross section of one of the left-handed helixes of FIG. 5 with a circular cross section filament.
Figure 10:
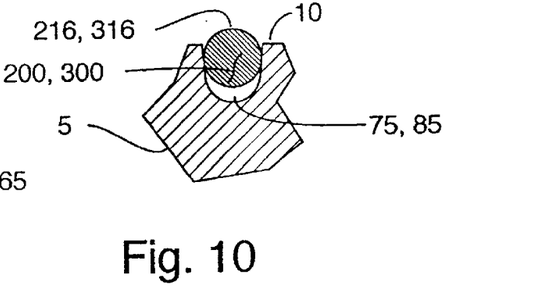
FIG. 10. Detail showing the cross section of one of the right-handed helixes of FIG. 5 with a circular cross section filament.

FIGS. 9 and 10, in combination with FIGS. 5 and 6, illustrate that a helical filament gripping groove (55, 65) which will hold a filament (200, 300) of the first (innermost) filament coil (215, 315) may be of different depth than another parallel helical filament gripping groove (75, 85) which will hold a filament (200, 300) from a second (or outermost) filament coil (216, 316).

FIGS. 9 and 10 illustrate that the helical filament gripping grooves (55, 65, 85, 75) may be tapered to accommodate small variations in the size of the filament (200, 300).

Figures 11, 12:
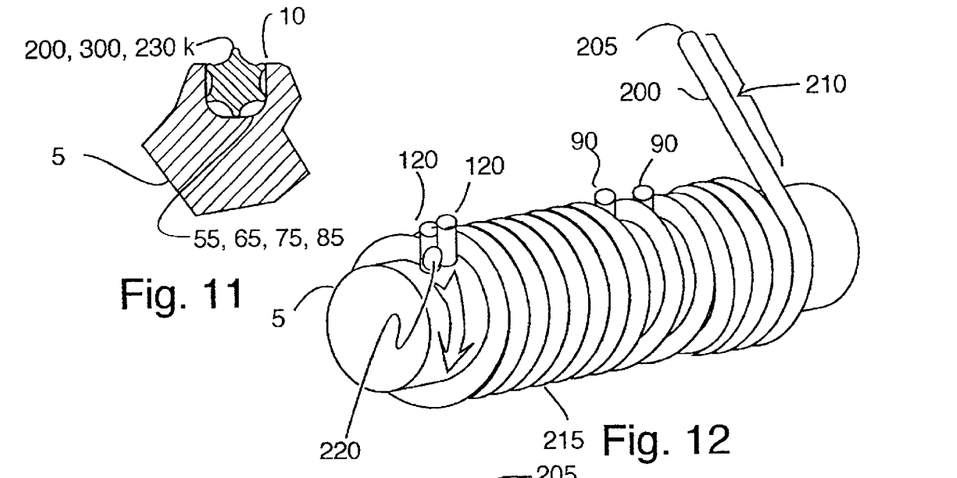
FIG. 11. Detail showing the cross section of a helical groove designed for a filament of star-shaped cross section.
FIG. 12. Oblique view of a spool impeller wound with filament and equipped with mechanical clips to hold the filament in place when the trimmer is off.
Figure 19:
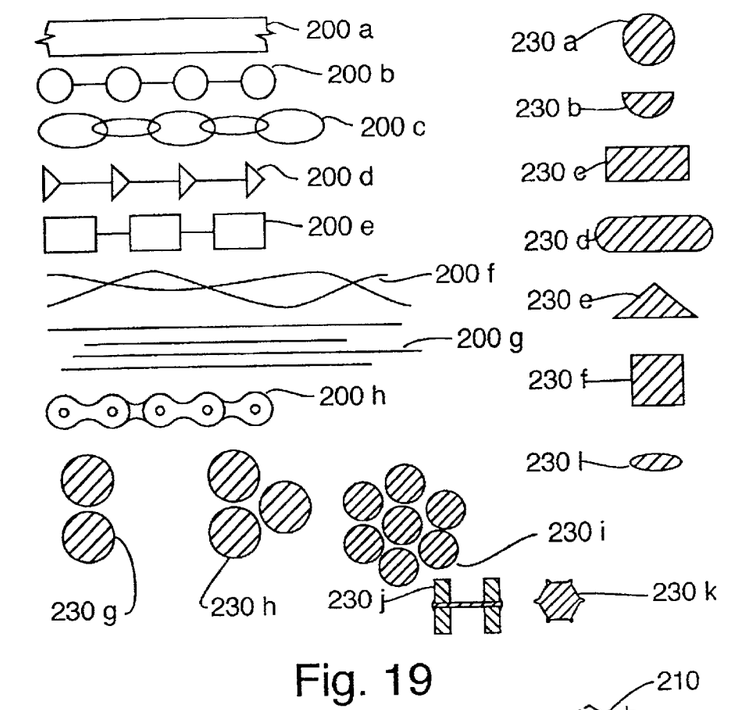
FIG. 19. Illustrations of example filament side views and cross sections.

FIG. 11, in conjunction with FIGS. 5, 6, and 19, illustrates that the helical filament gripping grooves (55, 65, 75, 85) may be contoured to accommodate variations in the shape of a filament (200 and 300). Example variations on the cross-section shape (230a–l) of filament (200, 300, 200a–h) are depicted in FIG. 19. The particular example of FIG. 11 shows a filament gripping groove (55, 65, 85, 75) inscribed on the surface (10) of spool (5) of a groove shape designed to accommodate a filament (200, 300) of star-shaped cross section (230k). Other filament cross sections and filament side views although not shown in FIG. 19 are included in this specification provided that the filament shape is suitable for the intended purpose of the automatic spool filament impeller's application.

FIG. 12 illustrates one preferred embodiment which includes a feature for controlling the unraveling of filament (200). FIG. 12, illustrates one example of how the filament (200) coil (215) may be held in place, when the trimmer is turned off and the free moving distal end (205) of the filament (200) comes to a rest from the rotational action of the spool (5). Other means for controlling the unraveling of filament (200) are presented throughout the specification and through discussion of FIGS. 15, 16, 17, and 18 below.

One means for holding coil (215) in place, as illustrated in FIG. 12, is by applying at least one first set of mechanical clips (90) which do not grip the filament (200) so tightly as to interfere with unwinding. A plurality of first sets of mechanical clips may be distributed throughout the axial length of the spool (5). The filament (210) anchor tip, proximal end (220) is anchored to the spool (5) by at least one or at least one set of second mechanical clips (120). The second mechanical clips (120) may comprise single units or pairs of pins or wedges or hooked pins or U-shape pins. The second mechanical clips engage the filament (210) to the spool in a manner sufficient to minimize the likelihood that the proximal end (220) will be disengaged from the spool (5) during rest or operation of the automatic spool filament impeller (1).

Figure 13:
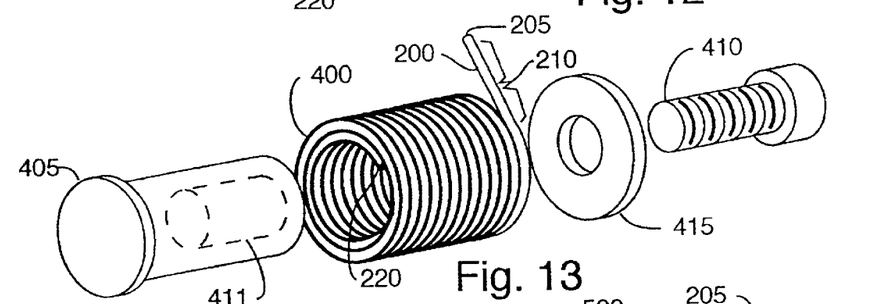
FIG. 13. Oblique view of a conical prefabricated filament coil with mounting device.
Figures 14, 15:
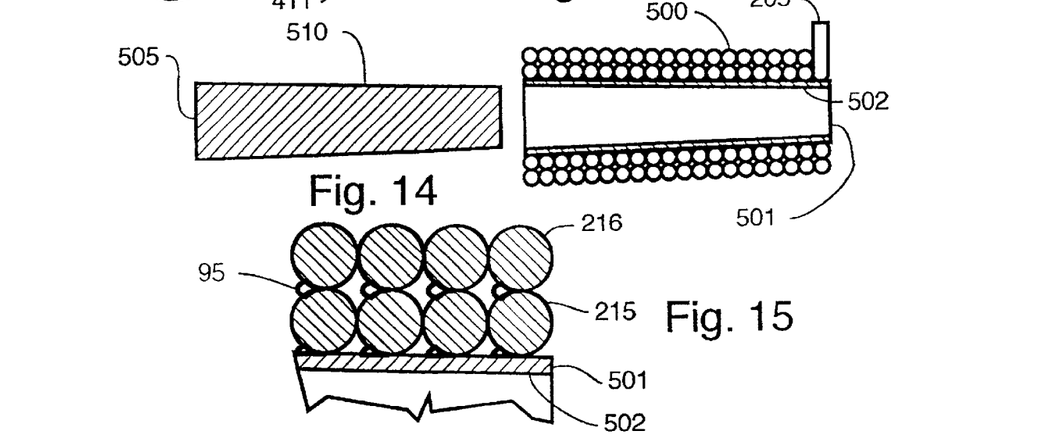
FIG. 14. Section view of a cylindrical prefabricated filament coil with a taper fit mounting spool.
FIG. 15. Detail showing a section of a cylindrical prefabricated filament coil illustrating the use of breakaway adhesive.

FIGS. 13 and 14 illustrate variations of one preferred embodiment of the invention which makes use of prefabricated filament coils. In FIG. 13, shows a substantially cylindrical mounting device (405) contoured to accept a substantially cylindrical helix of filament (200) namely a prefabricated filament coil (400). Once the filament coil (400) is built onto or slipped onto the cylindrical mounting device (405), the prefabricated filament coil (400) is held in place by a washer (415) and a bolt (410) which engages the corresponding female bolt receptacle (411) located within the cylindrical mounting device (405). The means for engaging the male bolt with the female bolt receptacle may be through the use of inscribed matched screw threads or other types of mechanisms such as application of pressure to the cylindrical mounting device (405) and bolt (410) to force them in position to engage irregular surfaces that come in contact or else to apply the well-known mechanical principle of the taper fit. Temporary glue or other temporary bonding material may also be used to temporarily engage the cylindrical mounting device (410) and bolt (410)

FIGS. 14 and 15 illustrate one preferred embodiment using a conical mounting device (505) with a conical surface (510) designed to accept a conical prefabricated filament coil (500) wound on a conical disposable winding form (501). The conical disposable winding form (501) may comprise paper or cardboard or thin plastic. The inside conical surface (502) of the conical disposable winding form (501) is designed to lock onto the conical surface (510) by virtue of the well-known mechanical principle of the taper fit, thus providing a simple and quick means of installation.

FIG. 15 illustrates a conical prefabricated filament coil (500) held together by temporary, breakaway adhesive (95) and assembled onto a conical disposable winding form (501).

Figures 16, 17, 18:
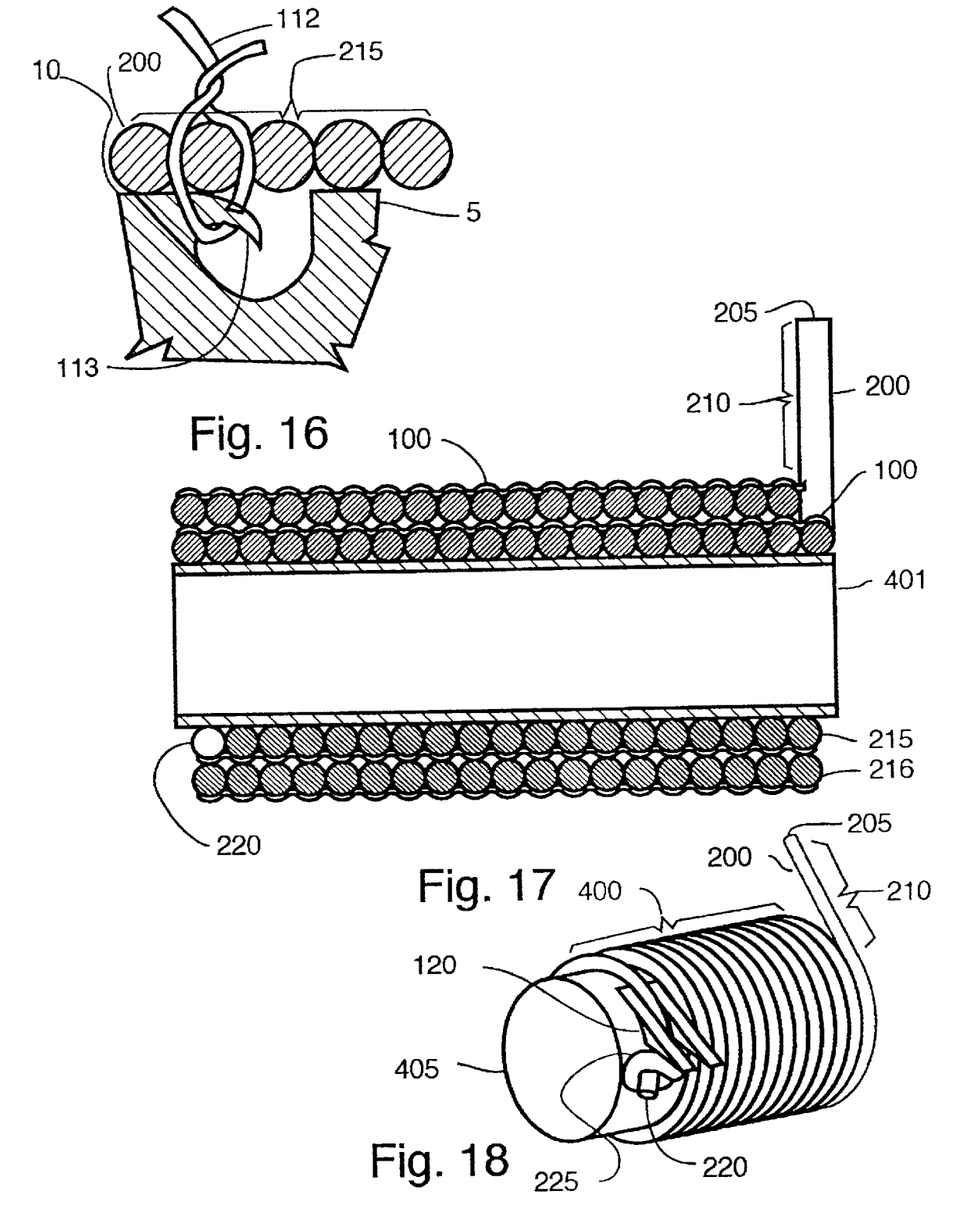
FIG. 16. Detail showing a section of coiled filament illustrating the use of a breakaway tie and mechanical tie hook.
FIG. 17. Section view of a cylindrical prefabricated filament coil illustrating the use of cylindrical tearaway overwraps.
FIG. 18. Oblique view of a cylindrical prefabricated filament coil illustrating the use of a mechanical anchoring clip.

FIG. 16 illustrates one preferred embodiment which uses a mechanical means of securing a filament (200) to a spool. The Figure shows a detail of a breakaway tie (112) utilizing a mechanical tie hook (113) to grip a filament (200) to the cylindrical surface (10) of a spool (5).

FIG. 17 illustrates a cylindrical prefabricated filament coil (400) mounted on a cylindrical disposable winding form (401). The filament (200) is temporarily secured in its coil (215, 216) configuration by tearaway over wraps (100). The extended filament (210) having a distal end 205 is depicted to illustrate the breaking away as needed of the overwrap (100). As explained below, the tearaway overwrap may comprise a plastic film (100, 101, 102) or a combination of plastic film and adhesive (103).

FIG. 18 illustrates a cylindrical prefabricated filament coil (400) with the proximal end (220) of the filament (200) anchored to the mounting device (405) with a mechanical anchoring clip (120).

FIG. 19 illustrates various example filament (200) side views (200a–h) and cross sections (230a–k). Other filament configurations may be used, the important aspect of the shape and material of the filament (200) used is that it be of appropriate characteristics and scale for the particular application.

FIG. 20 is a top view of an automatic spool filament impeller (1) having multiple extended filaments (210) in simultaneous operation, rotating about the rotatable shaft (600) to inscribe a cutting swath (25).

FIG. 21 is an oblique view of one embodiment having "stacked" automatic spool filament impeller (1) segments, all rotating in the same direction, about the same axis (15). This embodiment allows the effective cutting swath (25) to be three dimensional. That is to say, there is an effective operating zone that is not limited to the plane of a single or double extended filament within the same plane. In some applications it may be desirable to have more than one impact zone to either speed up the process or to cover a larger affected area at the same time.

Figures 22, 23, 24, 25, 26, 27:
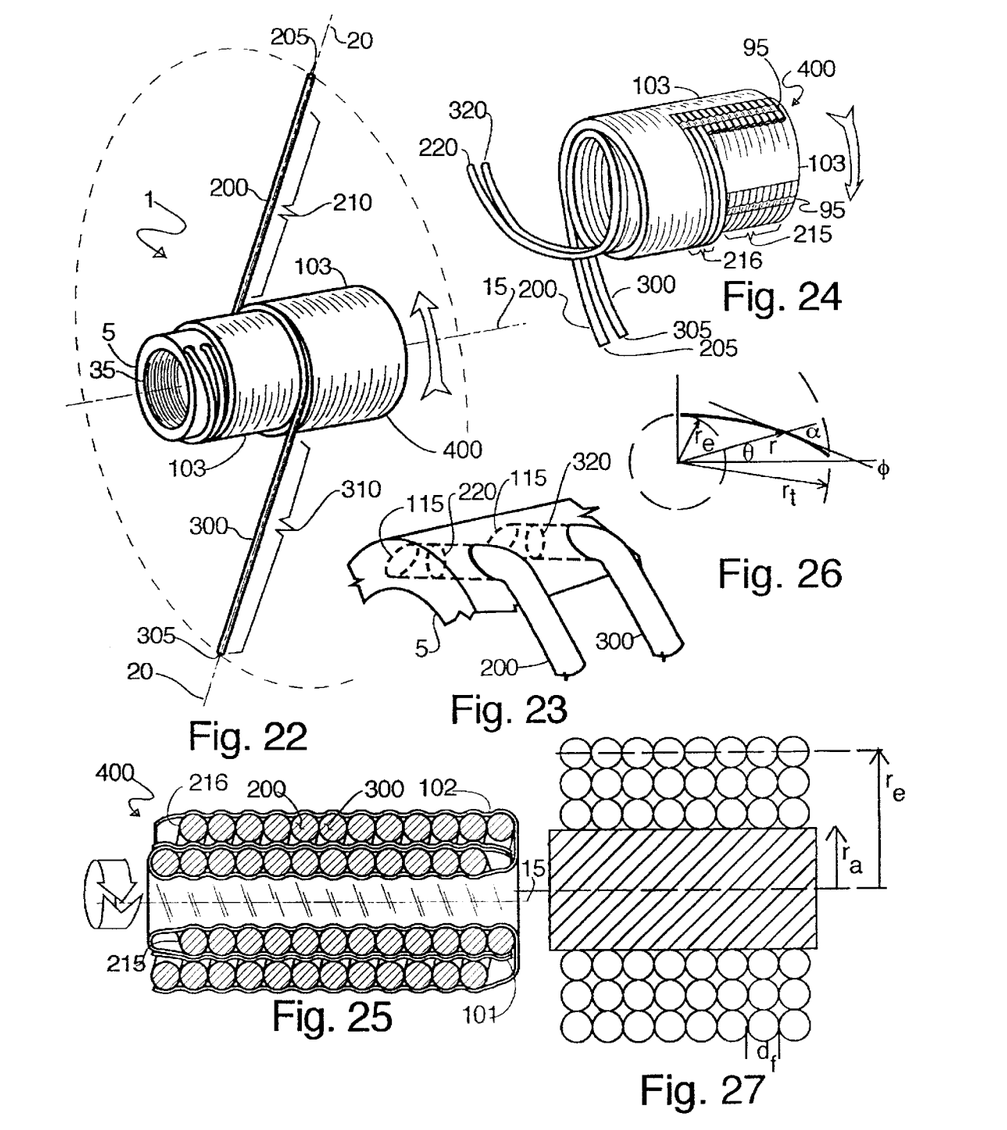
FIG. 22. Oblique view of an automatic spool filament impeller employing a prefabricated filament coil.
FIG. 23 Detail showing the prefabricated filament coil anchoring technique.
FIG. 24. Oblique, cutaway view of a prefabricated filament coil
FIG. 25. Side view, sectioned by a horizontal plane, of a prefabricated filament coil, illustrating the use of an enclosing tearaway overwrap.
FIG. 26. Illustration of the geometrical definition of mathematical symbols.
FIG. 27. Illustration of the effective size of the spool.

For the following discussion, refer to FIGS. 22, 23, 24, and 25. FIG. 24 illustrates the use of an adhesive tearaway overwrap (103). FIG. 25 illustrates the use of an enclosing tearaway wrap (102). Each of these two features serves several purposes, as discussed below.

Design considerations for prefabricated filament coils include:

(A) A prefabricated filament coil (400) must be stable enough to be handled and installed without coming apart. The adhesive tearaway overwrap (103) and the enclosing tearaway wrap (102) both serve this purpose.

(B) In operation, the wrapping (100, 102, or 103) between two filament layers (215 and 216) can be damaged by abrasion caused by small position fluctuations between the two filament layers (215 and 216), and the damaged wrapping (100, 102, or 103) may subsequently fail to prevent uncoiling. Abrasion damage to the wrapping (100, 102, or 103) can be reduced or eliminated with a protective tearaway overwrap (101), as shown in FIG. 25, which acts as a "lubricant" minimizing the wearing effect on the stabilizing wrap film between coil layers.

(C) In operation, because centrifugal force acting on the extended filament (210) cinches the coils tight, the coils of the second layer (216) have a tendency to intrude between the coils of the first layer (215), tearing the wrapping (100, 102, or 103) and pushing the separated coils apart. The adhesive tearaway overwrap (102, 103) and the enclosing tearaway wrap (102) both serve to eliminate intrusion damage by constraining the filament coils against axial separation. The adhesive tearaway overwrap (103) constrains the filament layer because the filament (200, 300) is bonded by the adhesive (95) to the wrapping (100). The enclosing tearaway wrap (102) constrains the filament layer (215, 216) by mechanically enclosing it.

(D) As a filament layer (215, 216) becomes depleted and as the wrapping (100, 102, or 103) becomes shorter and shorter, the wrapping (100, 102, or 103) becomes prone to slip off prematurely. The adhesive tearaway overwrap (103) is resistant to premature slippage because it is bonded to the filament layer (215, 216). The enclosing tearaway wrap (102) is resistant to premature slippage because it is mechanically held in place.

FIG. 22 illustrates an automatic spool filament impeller (1) composed of a prefabricated filament coil (400) mounted on spool (5). In FIGS. 23 and 24, the prefabricated filament coils (400) are formed by winding two filaments (200 and 300) side by side to form two filament layers (215 and 216), and each layer is equipped with a adhesive tearaway overwrap (103). In FIG. 22, the first filament coil layer (215) is a right-hand double helix, the second coil layer (216) is a left-hand double helix. In FIG. 24, the first coil layer (215) is left-handed, the second coil layer (216) is right-handed. In FIG. 23, the proximal ends (220 and 320) of the filaments (200 and 300) are simply inserted into the anchor holes (115) of the spool (5).

In FIG. 24, the adhesive tearaway overwraps (103) and the second filament coil (216) are cut away to show lines of breakaway adhesive (95). In some embodiments, each adhesive tearaway overwrap (103) has at least one application of breakaway adhesive (95) between the overwrap (103) and the coil (216) surface it is intended to stabilize.

In FIG. 25, each filament layer (215, 216) of the prefabricated filament coil (400) is enclosed by an enclosing tearaway wrap (102). A protective tearaway overwrap (101) is installed under the second filament layer (216).

Common shrink-wrap plastic film works especially well for tearaway wrap material because the wrapping (100, 101, 103) can easily be drawn tight and contoured to the particular coil. Shrink wrap works particularly well for tearaway overwrap. The tension created by the shrink wrap does a good job of holding things in place. This tight wrapping produces an especially stable prefabricated filament coil (400) and yet the plastic film tears or wears away easily as needed. Other film having similarly desirable characteristics may be used.

There are various types of breakaway adhesives (95) suitable for specific applications. Glues have varying "flowing" or melt temperatures, adhesion, and brittleness characteristics. Of the various heat melt glues, some may be better than others for the particular application. For example hobbyist's general-purpose heat melt glue works well as a breakaway adhesive (95) in some weed trimming applications because it bonds only moderately well to nylon filament (200) and this type of glue readily cures in ambient temperatures. Some glues with similar desirable characteristics may cure under ultraviolet light or contact with chemical agents or catalysts. In some applications, it may be desirable to combine the step of applying a breakaway adhesive (95) and wrapping film (100, 101, 102) to stabilize prefabricated filament coil (400) by using the overwrap film material with a pre-coating of breakaway adhesive (103).

The stability of the prefabricated filament coil is a desirable feature of the invention for efficient shipping, storage and display of the unused coil. Once the consumer starts to use the prefabricated filament coil (400) in conjunction with a spool filament impeller (1), the same stabilizing factor helps maintain orderly use and storage of the filament (200) without unnecessary unraveling. The breakaway adhesive (95) may be used in combination with the overwrap film (100, 101, 102, 103). The breakaway adhesive (95) or the shrink wrap film (100, 101, 102, 103) may be used to effectively stabilize the coil without using the other.

FIG. 26 illustrates the geometrical definition of mathematical symbols referenced in this specification.

FIG. 27 illustrates the effective size of the spool.

Figure 28:
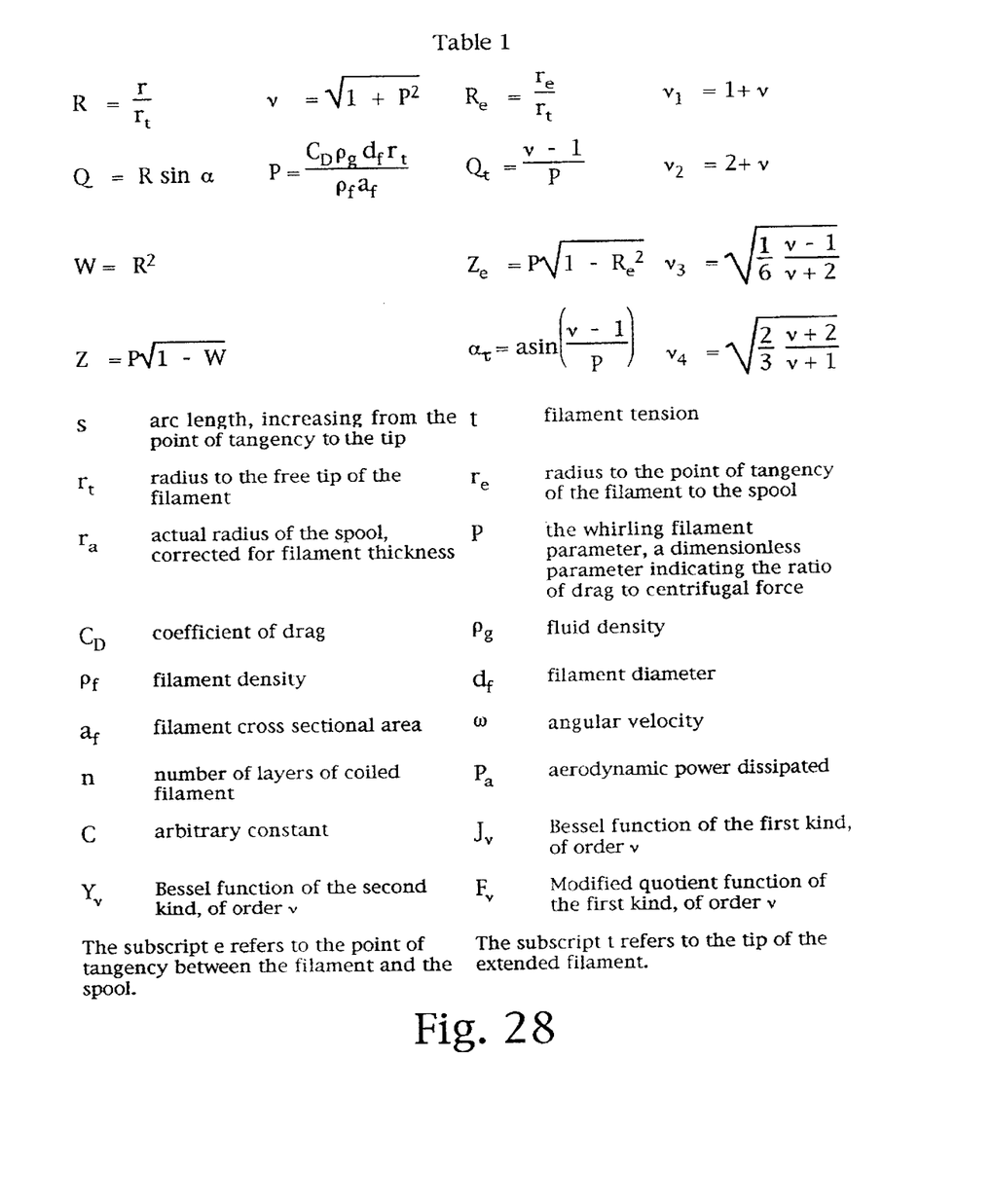
FIG. 28. Table 1 of mathematical definitions.

FIG. 28 shows a table of mathematical definitions, labeled Table 1.

Figure 29:
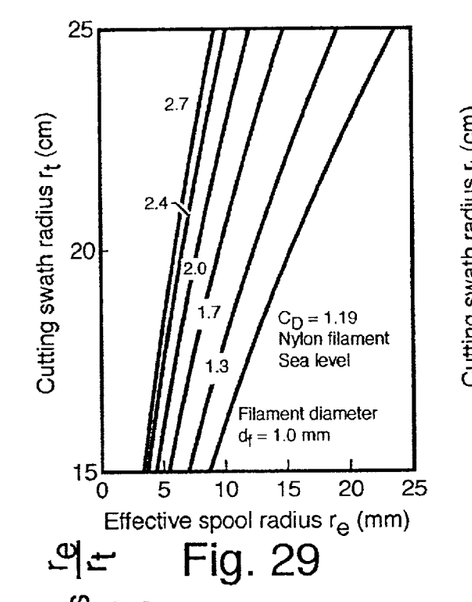
FIG. 29. Illustration of the effect of the effective size of the spool on the cutting swath.

FIG. 29 graphically illustrates the effect of using an appropriately sized spool on the cutting swath.

Figure 30:
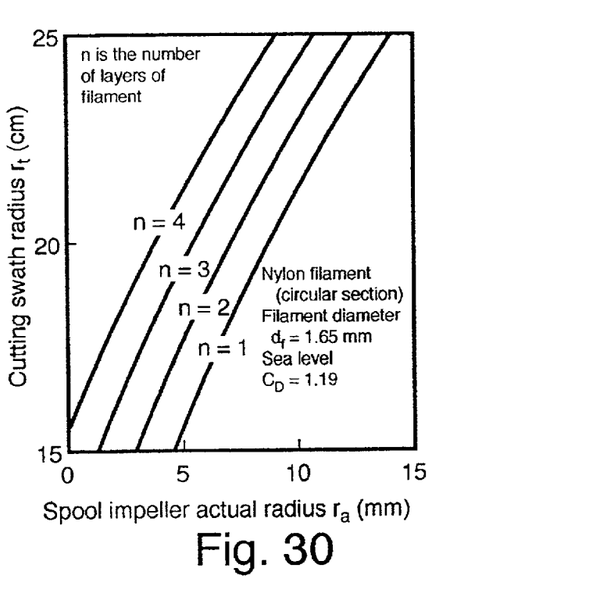
FIG. 30. Illustration of the effect of the number of filament layers on the size of the cutting swath.

FIG. 30 graphically illustrates the effect of varying the number of filament layers on the size of the cutting swath.

Figure 31:
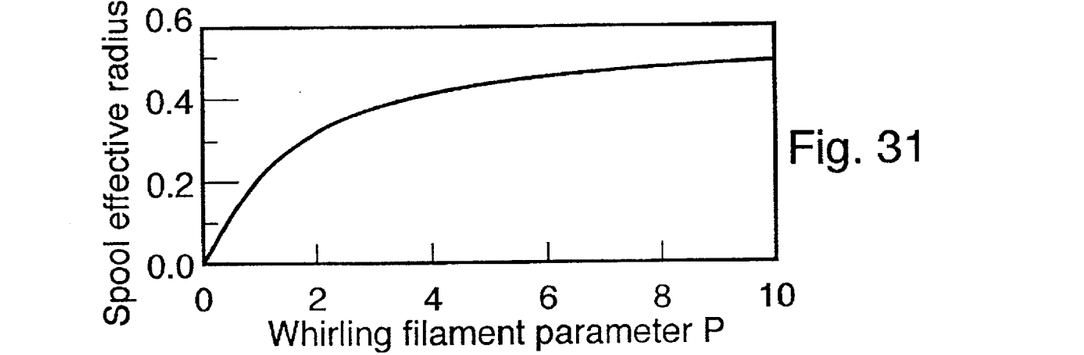
FIG. 31. Illustration of the effect of the whirling filament parameter on the size of the cutting swath.

FIG. 31 graphically illustrates the effect of the whirling filament parameter on the size of the cutting swath.

Figure 32:
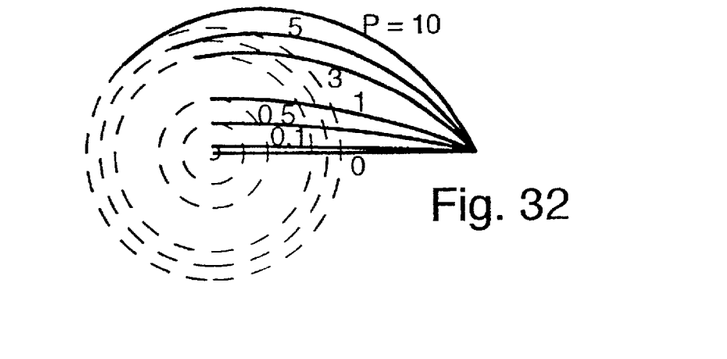
FIG. 32. Illustration of the effect of the whirling filament parameter on the geometry of the extended filament.

FIG. 32 graphically illustrates the effect of the whirling filament parameter on the geometry of the extended filament The following discussion further describes the operation of the automatic spool filament impeller (1) both from a functional perspective and from a mathematical perspective.

Each time one of the layers of filament coil is used up, the effective size of the spool radius decreases and there is a corresponding reduction in the size swath (25). This fact must be kept in mind when deciding how many layers of coil windings are suitable for a particular application and particular type of filament (210) to be used. The change in effective radius of the spool (5), as the coil (215) layers unwind, must be consistent with the desired swath (25) size range required by the particular application.

Equation (E1) corrects the actual spool size for the effect of filament thickness. (NOTE: Mathematical symbols are defined in FIGS. 26, 27, and FIG. 28, which shows Table 1.)

$$r_e = r_a + [1 + 2(n-1)]\frac{d_f}{2} \quad n = 1, 2, \ldots \tag{E1}$$

Neglecting this correction can produce significant error. FIGS. 29 and 30 show the effect of actual and effective spool size on the size of the cutting swath.

$$-\frac{1}{2}C_D\rho_g d_f r^3 \cos^2\alpha dr + d(Tr\sin\alpha) \tag{E2}$$

$$d_T = -\frac{1}{2}\rho_f a_f \omega^2 r dr \tag{E3}$$

The following analysis predicts the correct spool impeller size, the power consumption, and the geometry of the extended filament. If the aerodynamic drag is proportional to the square of the normal component of the flow velocity, if the drag along the filament is zero, and if the filament has zero stiffness, then the differential equations governing the equilibrium filament behavior are:

Equation (E2) expresses that the net torque on any segment of the extended filament is zero. These equations are obtained by reducing the general equations of Roos, Schweigman and Timman.

The tension is zero at the filament tip, so $$T = \frac{1}{2}\rho_f a_f \omega^2 (r_t^2 - r^2) \tag{E4}$$

The tension depends only on r, a consequence of zero drag along the filament.

In dimensionless form, Equation (E2) may be written:

$$PQ^2 dW - PW dW - 2d[(1-W)Q] = 0 \tag{E5}$$

The dimensionless parameter P (the whirling filament parameter) is the ratio of drag to centrifugal force.

The solution of Equation (E5) was determined by Mack as follows:

$$Q = \frac{1}{P}\left[ZJ_\nu'(Z) + \frac{CY_\nu'(Z)}{J_\nu(Z) + CY_\nu(Z)} - 1\right] \tag{E6}$$

For a filament of zero stiffness, drag and centrifugal force are properly balanced at a free filament tip if and only if $$Q_t = \frac{\nu - 1}{P} \tag{E7}$$

With the boundary condition Equation (E7), Equation (E6) reduces to $$Q = \frac{1}{P}[F_\nu(Z) - 1 - \nu] \tag{E8}$$

At the point of tangency, $$R_e = \frac{1}{P}[F_\nu(Z_e) - 1 - \nu] \tag{E9}$$

A simpler solution, which can be solved explicitly for $R_e$, is obtained by writing a three-term power series.

$$W = 1 + \frac{2}{P}\nu_1(Q - Q_t) + \frac{\nu_1}{\nu_2}(Q - Q_t)^2 \tag{E10}$$

$$R_e = \frac{3\nu_1 - \sqrt{6\nu_1\nu_2}}{P} \tag{E11}$$

FIG. 31 shows the effect of P on $R_e$ predicted by Equation (E11).

With the relation $\theta = \alpha - \phi$ and with Equation (E10), the geometry of the extended filament can be calculated using:

$$d\phi = \frac{dQ}{R\cos\alpha} = \frac{dQ}{\sqrt{W - Q^2}} \tag{E12}$$

to obtain:

$$\phi = \alpha_t + \sqrt{\nu_2}\{a \sin[\nu_4 - (Q - Q_t)\nu_3] - a \sin(\nu_4)\} \tag{E13}$$

FIG. 32 shows the filament geometry for several values of P predicted by Equation (E13).

The aerodynamic power to spin the trimmer is $$P_a = \frac{1}{2}\rho_f a_f \omega^3 (r_t^2 - r_e^2) r_e \tag{E14}$$

For small values of P, using Equation (E11), results in the following:

$$P_a = \frac{1}{8}C_D\rho_g d_f \omega^3 r_t^4 \left(1 - \frac{7}{24}P^2 + \ldots\right) \tag{E15}$$

If the tip radius is increased while keeping the angular velocity constant, the power increases with the fourth power of the tip radius. If the filament tip speed is kept constant, the power increases linearly with the tip radius. If power is constant, then the angular velocity varies as the tip radius to the negative four-thirds power.

These results can be accurately applied to filaments of non-zero stiffness, nylon cutting line for example, because the effect of tension outweighs the effect of stiffness.

However, since the tension is zero at the filament tip, features at the filament tip such as curvature and orientation will not be accurately predicted, especially if the filament acquires a permanent set on the coil. Other features are accurately predicted, and neglecting stiffness is justified by the simplification of the analysis: note that the equations depend on a single parameter, P.

Although preferred embodiments of the present invention have been described in the foregoing Detailed Description text and illustrated in the accompanying drawings, it will be understood that the invention is not limited to the embodiments disclosed, but is capable of numerous rearrangements, modifications, and substitutions of parts and elements without departing from the spirit of the invention. For example, the present invention comprises a variety of filament types each suitable for different applications. Additionally, application of the invention is not limited to vegetation trimmers; combination of the present invention with other special purpose devices would provide similar advantages of reduced cost, increased reliability, predictability of effected swath, ease of device preparation, operation and maintenance. The spool impeller is useful for any process involving a whirling filament which is consumed or worn off. Examples of use in other applications are described in this specification. Accordingly, the present invention is intended to encompass such rearrangements, modifications, and substitutions of parts and elements as fall within the scope of the appended claims.

What is claimed is:

1. A dispenser for automatically maintaining a length of extended line, comprising:
   a spool adapted to be mounted to a rotary drive element for rotation therewith;
   a flexible line coiled on the spool and having an extended portion that extends from the spool; and
   control means for automatically maintaining the length of the extended portion of the flexible line, wherein the extended portion is lengthened by unwrapping the extended portion from the spool, and wherein the extended portion is shortened by wrapping the extended portion back onto the spool.

2. The dispenser of claim 1 wherein the line is consumed due to contact with a target.

3. The dispenser of claim 1 wherein the control means utilizes aerodynamic drag to shorten the extended portion.

4. The dispenser of claim 1 wherein the control means utilizes centrifugal force to dispense line from the spool and aerodynamic drag to shorten the extended portion of the line.

5. The dispenser of claim 1 wherein the control means utilizes centrifugal force and aerodynamic drag to counterbalance the extended portion of the line to control the length thereof.

6. An apparatus with fully automated length control, comprising: a spool adapted to be mounted to a rotary drive element for rotation therewith;
   a flexible line mounted to the spool and having an extended portion that extends from the spool; and
   control means for automatically controlling the length of the extended portion of the line, wherein the extended portion is lengthened by dispensing additional line from the spool, and wherein the extended portion is shortened without cutting the line.

7. The apparatus of claim 6 wherein the line is consumed due to contact with a target.

8. The apparatus of claim 6 wherein the control means utilizes aerodynamic drag to shorten the extended portion of the line.

9. The apparatus of claim 6 wherein the control means utilizes centrifugal force to dispense line from the spool and aerodynamic drag to shorten the extended portion of the line.

10. The apparatus of claim 6 wherein the control means utilizes centrifugal force and aerodynamic drag to counterbalance the extended portion of the line to control the length thereof.

11. The apparatus of claim 6 wherein the line is at least partially-coiled on the spool, such that the line uncoils from the spool to increase the length of the extended portion, and rewinds onto the spool to decrease the length of the extended portion.

12. A dispenser with fully automated length control, comprising:
   a spool adapted to be mounted to a rotary drive element for rotation therewith;
   a consumable filament associated with the spool and having an extended portion that, during rotation, is substantially tangent to the spool, the extended portion having a length with a free end that defines a circular swath having a swath radius measured from the spool to the free end, wherein the extended portion maintains a linear orientation from the spool to the free end prior to contact with a target; and wherein
   as the extended portion of the filament is consumed during rotation due to contact with the target such that the length of the extended portion is reduced to less than the swath radius, additional filament is automatically dispensed from the spool by centrifugal force until aerodynamic drag acting on the extended portion counterbalances the centrifugal force.

13. The dispenser of claim 12 wherein when the length of the extended portion temporarily exceeds the swath radius, the length of the extended portion is automatically reduced by aerodynamic drag acting on the extended portion until centrifugal force counterbalances the aerodynamic drag.

14. The dispenser of claim 12 wherein the filament is at least partially-coiled on the spool, such that the filament uncoils from the spool to increase the length of the extended portion, and rewinds onto the spool to decrease the length of the extended portion.

* * * * *